US012692988B2

(12) United States Patent
Xue et al.

(10) Patent No.: US 12,692,988 B2
(45) Date of Patent: Jul. 28, 2026

(54) PRESSURE BOOSTING SYSTEM FOR MULTI-PHASE CRUDE OIL

(71) Applicants: SAUDI ARABIAN OIL COMPANY, Dhahran (SA); AL-KHORAYEF PETROLEUM COMPANY, Dammam (SA)

(72) Inventors: Ying Xue, Shanghai (CN); Woon Yung Lee, Sugar Land, TX (US); Jinjiang Xiao, Dhahran (SA); Chidirim Enoch Ejim, Dhahran (SA)

(73) Assignees: SAUDI ARABIAN OIL COMPANY, Dhahran (SA); AL-KHORAYEF PETROLEUM COMPANY, Dammam (SA)

( * ) Notice: Subject to any disclaimer, the term of this patent is extended or adjusted under 35 U.S.C. 154(b) by 45 days.

(21) Appl. No.: 18/720,925

(22) PCT Filed: Nov. 11, 2022

(86) PCT No.: PCT/CN2022/131404
§ 371 (c)(1),
(2) Date: Jun. 17, 2024

(87) PCT Pub. No.: WO2024/098384
PCT Pub. Date: May 16, 2024

(65) Prior Publication Data
US 2025/0060078 A1 Feb. 20, 2025

(51) Int. Cl.
*F17D 1/00* (2006.01)
*E21B 43/34* (2006.01)
(Continued)

(52) U.S. Cl.
CPC .............. *F17D 1/005* (2013.01); *E21B 43/35* (2020.05); *E21B 43/34* (2013.01); *F04F 5/24* (2013.01); *F17D 1/14* (2013.01)

(58) Field of Classification Search
CPC . F17D 1/005; F17D 1/14; E21B 43/35; E21B 43/34; F04F 5/24
(Continued)

(56) References Cited

U.S. PATENT DOCUMENTS

| | | | | |
|---|---|---|---|---|
| 4,458,494 A * | 7/1984 | Fekete | ...................... | F25B 9/04 96/210 |
| 4,673,335 A * | 6/1987 | Nicodemus | ............... | F04F 5/24 417/174 |

(Continued)

FOREIGN PATENT DOCUMENTS

| | | |
|---|---|---|
| CN | 203822283 U | 9/2014 |
| CN | 109577927 A | 4/2019 |

(Continued)

OTHER PUBLICATIONS

International Search Report issued for corresponding international patent application No. PCT/CN2022/131404, mailed Jul. 14, 2023 (5 pages).

(Continued)

*Primary Examiner* — Minh Q Le
(74) *Attorney, Agent, or Firm* — Osha Bergman Watanabe & Burton LLP

(57) ABSTRACT

A system (200) for pumping a multi-phase feed mixture includes a separation section (230) having a separation tank (206), a mixing section (240), and a pumping section (250). The separation tank (206) has a feed mixture entrance (204) and a liquid outlet (215) located at different axial positions along a wall of the separation tank (206). A gas line (212) extends through the separation tank (206) from a gas inlet (217) located in an interior of the separation tank to a gas outlet (218) located outside of the separation tank (206). The mixing section (240) includes a fluid suction chamber (220) surrounding the gas outlet (218), and a liquid line (216) fluidly connects the liquid outlet (215) to the fluid suction
(Continued)

chamber (220). The pumping section (250) includes a pump (226), and a diffuser (222) fluidly connects the fluid suction chamber (220) to a pump inlet (224).

19 Claims, 8 Drawing Sheets

(51) Int. Cl.
*F04F 5/24* (2006.01)
*F17D 1/14* (2006.01)

(58) Field of Classification Search
USPC .......... 137/14
See application file for complete search history.

(56) References Cited

U.S. PATENT DOCUMENTS

| | | | | |
|---|---|---|---|---|
| 5,254,292 | A * | 10/1993 | Gabryelczyk | F17D 1/005 166/267 |
| 5,294,214 | A * | 3/1994 | Conner | E21B 43/34 166/267 |
| 6,000,412 | A * | 12/1999 | Chan | C11D 1/8255 134/22.14 |
| 6,390,114 | B1 * | 5/2002 | Haandrikman | F17D 1/005 137/187 |
| 6,402,820 | B1 * | 6/2002 | Tippetts | G05D 9/04 96/183 |
| 6,458,191 | B1 * | 10/2002 | Lingelem | E21B 43/34 96/216 |
| 8,333,825 | B2 | 12/2012 | Sarshar et al. | |
| 9,353,614 | B2 | 5/2016 | Roth et al. | |
| 2005/0000572 | A1 * | 1/2005 | Muller | F17D 1/005 137/561 A |
| 2009/0152204 | A1 * | 6/2009 | Chantrel | E21B 43/34 210/512.1 |
| 2009/0178720 | A1 * | 7/2009 | Torres | F17D 1/005 137/561 A |
| 2010/0155970 | A1 | 6/2010 | Poorte et al. | |
| 2012/0103188 | A1 * | 5/2012 | Stinessen | F04D 25/0686 96/195 |
| 2014/0246095 | A1 * | 9/2014 | Ellis | F04B 23/08 137/565.29 |
| 2015/0218919 | A1 * | 8/2015 | Beg | B04C 9/00 137/154 |
| 2016/0115775 | A1 * | 4/2016 | Eaton | C10L 3/107 95/228 |
| 2016/0290331 | A1 * | 10/2016 | Bibet | F04C 14/26 |
| 2018/0093203 | A1 * | 4/2018 | Husveg | B01D 17/0217 |
| 2018/0274730 | A1 * | 9/2018 | Hollaender | F17D 3/01 |
| 2020/0398287 | A1 * | 12/2020 | Mincher | F04F 5/24 |
| 2021/0062648 | A1 * | 3/2021 | Tian | E21B 47/10 |
| 2022/0364577 | A1 * | 11/2022 | Short | F04F 5/16 |
| 2024/0036593 | A1 * | 2/2024 | Alshehri | G05D 16/204 |
| 2025/0276337 | A1 * | 9/2025 | Laurent | B05B 7/0087 |

FOREIGN PATENT DOCUMENTS

| | | | |
|---|---|---|---|
| CN | 112113142 | A | 12/2020 |
| CN | 215139418 | U | 12/2021 |
| CN | 216643816 | U | 5/2022 |
| CN | 216976515 | U | 7/2022 |
| CN | 115059874 | A | 9/2022 |
| FR | 2299593 | A1 | 8/1976 |
| RU | 2098714 | C1 | 12/1997 |

OTHER PUBLICATIONS

Written Opinion issued for corresponding international patent application No. PCT/CN2022/131404, mailed Jul. 14, 2023 (4 pages).

* cited by examiner

PRESSURE BOOSTING SYSTEM FOR MULTI-PHASE CRUDE OIL

FIELD OF THE DISCLOSURE

Embodiments of the present disclosure generally relate to a system and a method for boosting the pressure of a multi-phase fluid mixture such as crude oil.

BACKGROUND

In the oil and gas industry, wells are drilled into the surface of the earth to access and produce hydrocarbons located in hydrocarbon reservoirs. Surface pumping systems are conventionally installed between a wellhead and trunk, or production line to pressurize well fluids and transfer them from the hydrocarbon reservoirs to a processing facility. Generally, a surface pumping system is chosen based on the application and depending on features including operational efficiencies, power consumption, environmental impact, ease of replacing, and reliability Conventional surface pumping systems used in oil and gas applications frequently handle oil and gas mixtures with high gas-volume fractions at an inlet to the pump. The gas-volume fraction is the ratio of free gas volume to the total volume of free gas and liquid, at a specific temperature and pressure. Mixture gas-volume fractions into these types of surface equipment can vary between 0 to 100 volume percent (vol. %). The high gas-volume fraction in the inlet of the surface pumping system may often create challenges including plaguing the pumping system, slugging flow, and causing high vibration of the surface pump. Such problems may result in an inability of the pumping section of the surface pumping system to develop sufficient boost pressure. Furthermore, when high vibrations are generated, the surface pumping system may face high stress on the structure of the surface pumping system and its components. This high stress may eventually lead to equipment or system failure. The associated remedial expenses and loss in production negatively impact the overall production efficiency and economics of the given field asset.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for pumping a feed mixture. The system may include a separation section, a mixing section, and a pumping section. The separation section may include a separation tank and a gas line. The separation tank includes a feed mixture entrance and a liquid outlet located at different axial positions along a wall of the separation tank. The gas line may extend through the separation tank from a gas inlet located in an interior of the separation tank to a gas outlet located outside of the separation tank. The mixing section may include a fluid suction chamber surrounding the gas outlet, and a liquid line may fluidly connect the liquid outlet to the fluid suction chamber. A flow control valve may be positioned along the liquid line. The pumping section may include a pump. A diffuser may fluidly connect the fluid suction chamber to a pump inlet.

In other aspects, a method for pumping a feed mixture is disclosed. The method may include first feeding the feed mixture into a separation tank of a pressure boosting system via a feed mixture entrance. The method may then include separating the feed mixture into a gas and a liquid in the separation tank. The method may include passing the liquid through a liquid outlet, wherein the liquid outlet is located at lower position from the feed mixture entrance along a wall of the separation tank. The method may also include passing the gas through a gas line extending through the separation tank from a gas inlet located in an interior of the separation tank to a gas outlet located outside of the separation tank. The method then may include simultaneously flowing gas through the gas outlet and flowing the liquid from the liquid outlet through a liquid line to a fluid suction chamber surrounding the gas outlet to mix the liquid and the gas into a mixed fluid, and flowing the mixed fluid through a diffuser to a pump.

Other aspects and advantages of the claimed subject matter will be apparent from the following description and the appended claims.

BRIEF DESCRIPTION OF DRAWINGS

Wherever possible, like or identical reference numerals are used in the figures to identify common or the same elements. The figures are not necessarily to scale, and certain features and certain views of the figures may be shown exaggerated in scale for purposes of clarification.

DETAILED DESCRIPTION

This specification describes technologies relating to a pressure-boosting system for pumping a multiphase fluid mixture. Pressure-boosting systems described herein may be suitable, for example, for pumping multiphase fluid mixtures in oil and gas applications. An example use of the described pressure-boosting system is pumping a high-volume fraction of hydrocarbon-rich oil from a well.

In one aspect, embodiments disclosed herein relate to pressure-boosting systems for pumping a feed mixture. The disclosed pressure-boosting systems may generally include a feed separation section, a mixing section, and a pumping section.

In another aspect, embodiments disclosed herein relate to methods for pumping a feed mixture utilizing a pressure-boosting system. The disclosed methods include feeding the feed mixture into a separation tank, separating the feed mixture into a gas and a liquid, passing the liquid through a liquid outlet and the gas through a gas line to simultaneously flow the gas and the liquid to a fluid suction chamber to mix them, and finally, flowing the mixed fluid through a diffuser to a pump.

As used herein, the term “pressure-boosting” refers to increasing the pressure of a fluid. A pressure-boosting system in accordance with one or more embodiments disclosed herein demonstrates the capability of increasing a fluid pressure for efficient pumping.

Pressure-boosting systems disclosed herein for pumping a feed mixture include at least three sections-a separation section, a mixing section, and a pumping section. The separation section includes a separation tank and a gas line. The separation tank includes a feed mixture entrance and a liquid outlet located at different axial positions along a wall of the separation tank. The gas line may extend through the separation tank from a gas inlet located in the interior of the separation tank to a gas outlet located outside of the separation tank. The mixing section includes a fluid suction chamber surrounding the gas outlet. A liquid line may fluidly connect the liquid outlet to the fluid suction chamber. A flow control valve may be positioned along the liquid line to control the flow of fluid through the liquid line. The pumping section includes a pump, such as an axial pump. A diffuser may fluidly connect the fluid suction chamber to a pump inlet.

Figure 1:
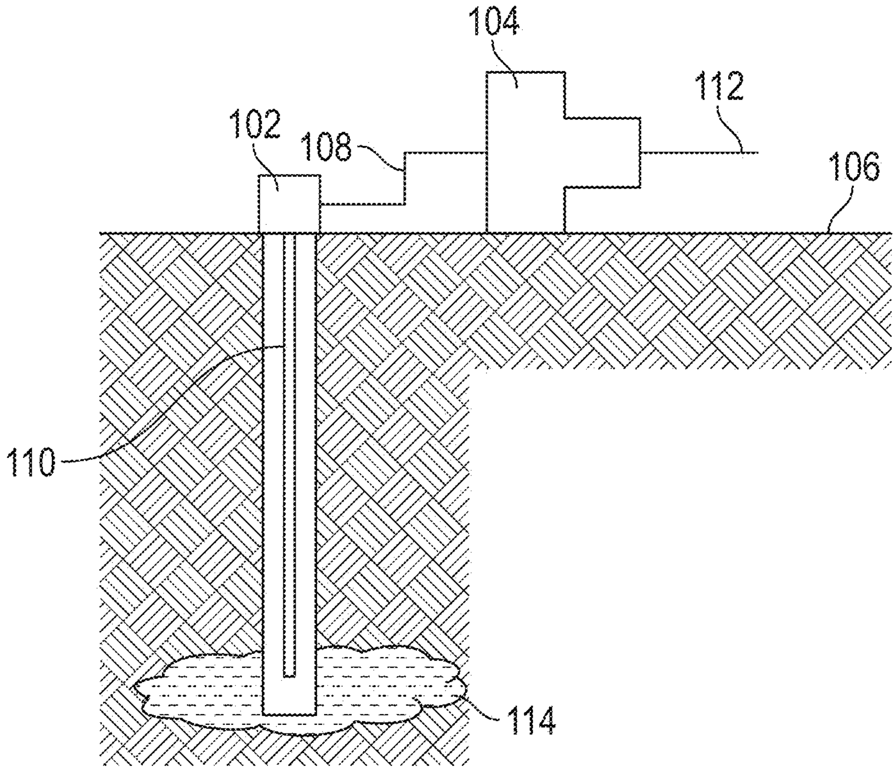
FIG. 1 is a schematic of an overall pressure boosting system in fluid communication with a wellbore in accordance with one or more embodiments of the present disclosure.

As illustrated. FIG. 1 shows an overview of an example pressure-boosting system in fluid communication with a wellbore in accordance with one or more embodiments of the present disclosure. The system includes a wellhead 102 and a pressure-boosting system 104 connected over ground 106. The wellhead 102 is connected to a wellbore 110 via which hydrocarbons are extracted from a formation 114. An inlet pipe 108 fluidly connects the wellhead 102 with the pressure-boosting system 104. A pump discharge line 112 is utilized to pump a hydrocarbon-rich fluid mixture from the wellbore 110.

Figure 2A:
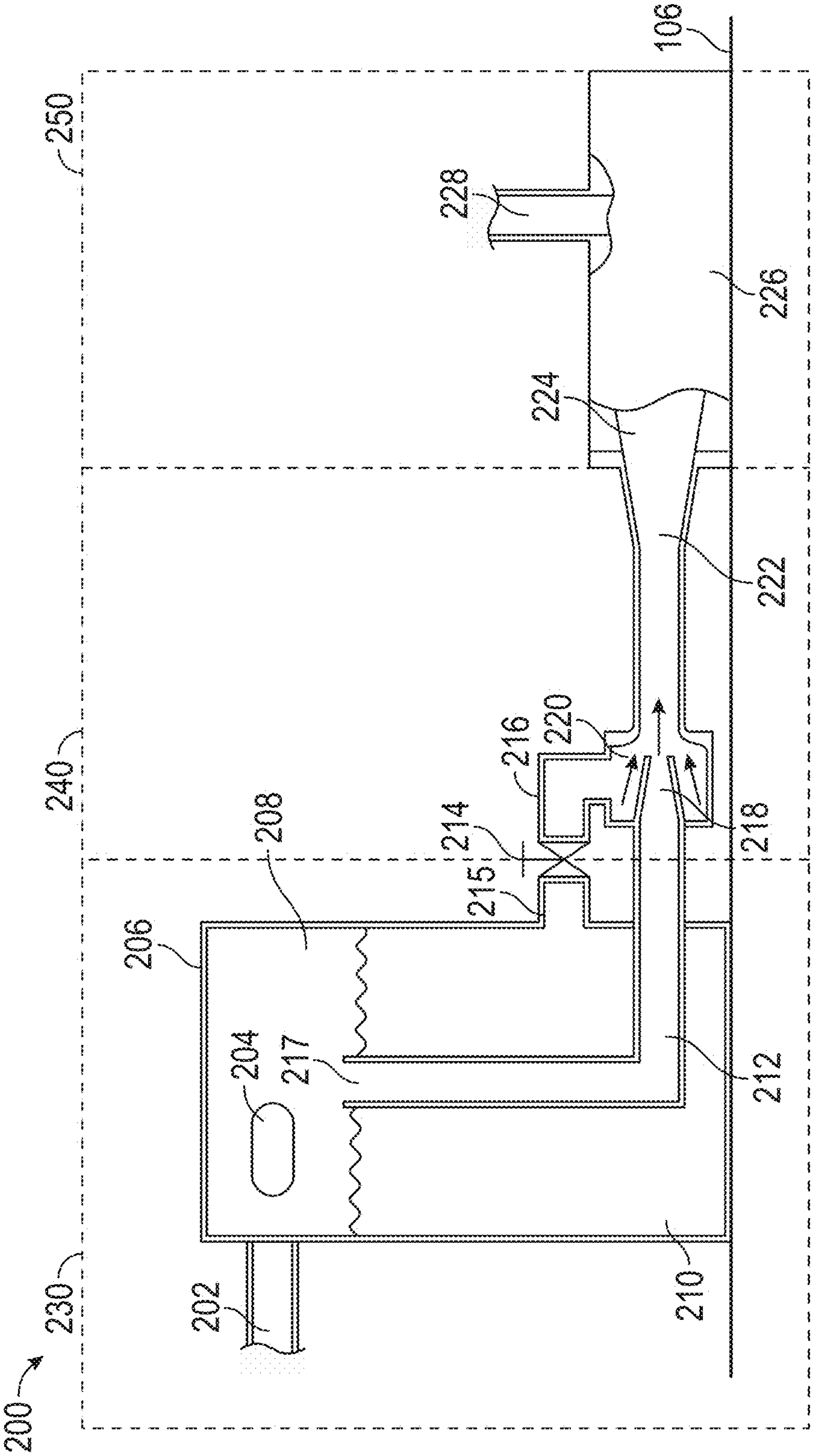
FIG. 2A is a schematic layout side view of a multiphase pressure boosting pumping system in accordance with one or more embodiments disclosed herein.

Referring to FIG. 2A, an exemplary pressure-boosting system 200 for increasing pressure of a multiphase fluid mixture, e.g., including crude oil, in accordance with one or more embodiments is shown. The pressure-boosting system 200 includes a separation section 230, a mixing section 240, and a pumping section 250. The separation, mixing, and pumping sections 230, 240, 250 are represented in FIG. 2A by dashed lines. As described in more detail below, the separation, mixing and pumping sections 230, 240, 250 each refers to a grouping of one or more components used for performing a step in a pressure-boosting process (e.g., a separation step, a mixing step, and a pumping step) and are not necessarily segmented, although they could be (e.g., in a separate housing or framed structures).

As shown in FIG. 2A, the separation section 230 includes a separation tank 206, a feed mixture entrance 204, a gas line 212, and a liquid outlet 215. The feed mixture is fed from the inlet line 202 into the separation tank 206 through the feed mixture entrance 204. The feed mixture may be a two-phase mixture, comprising a gas and a liquid. In the separation tank 206, the feed mixture may be separated into two phases—a gas 208 and a liquid 210—using gravity, where the relatively heavier liquid 210 phase sinks below the relatively lighter gas 208 phase. The separated liquid 210 may be transported out of the separation tank 206 through the liquid outlet 215. The liquid outlet 215 may be located at different axial positions along a wall of the separation tank 206 from the feed mixture entrance 204. For example, because gravity may be used to separate the liquid 210 phase from the gas 208 phase from a multiphase feed mixture, the liquid 210 may fall from a feed mixture entrance 204 located in an upper portion of the separation tank 206 toward a liquid outlet 215 in a lower portion of the separation tank 206. Additionally, gas 208 may be transported through the gas line 212, which may extend through the separation tank 206 from a gas inlet 217 located in an interior of the separation tank 206 to a gas outlet 218 located outside of the separation tank 206. Because the gas 208 may be collected in an upper portion of the separation tank 206 when gravity is used to separate the liquid 210 phase from the gas 208 phase, the gas inlet 217 of the gas line 212 may be positioned in the interior of the upper portion of the separation tank 206.

Figure 2B:
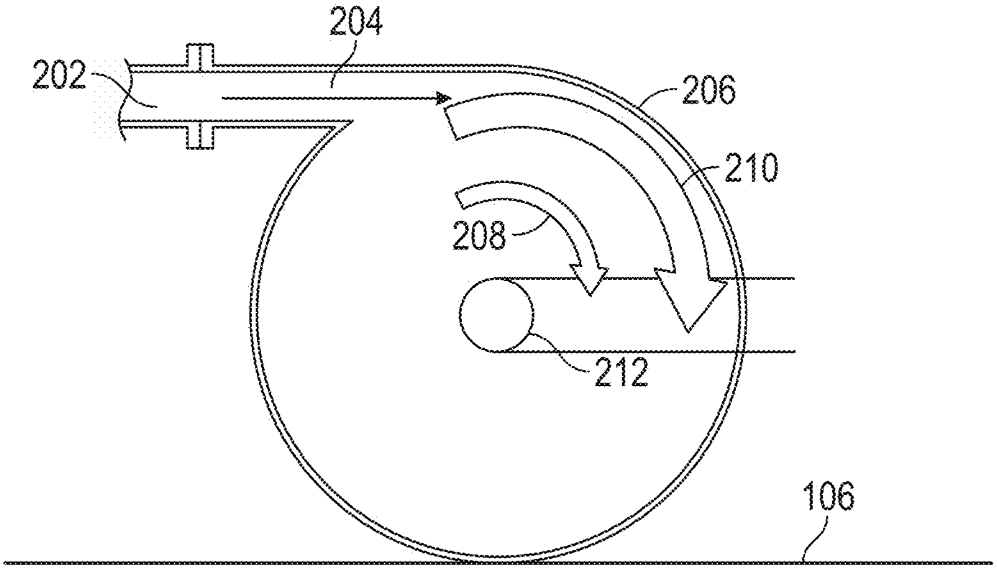
FIG. 2B is a schematic layout top view of a tank in a multiphase pressure boosting pumping system in accordance with one or more embodiments disclosed herein.
Figure 2C:
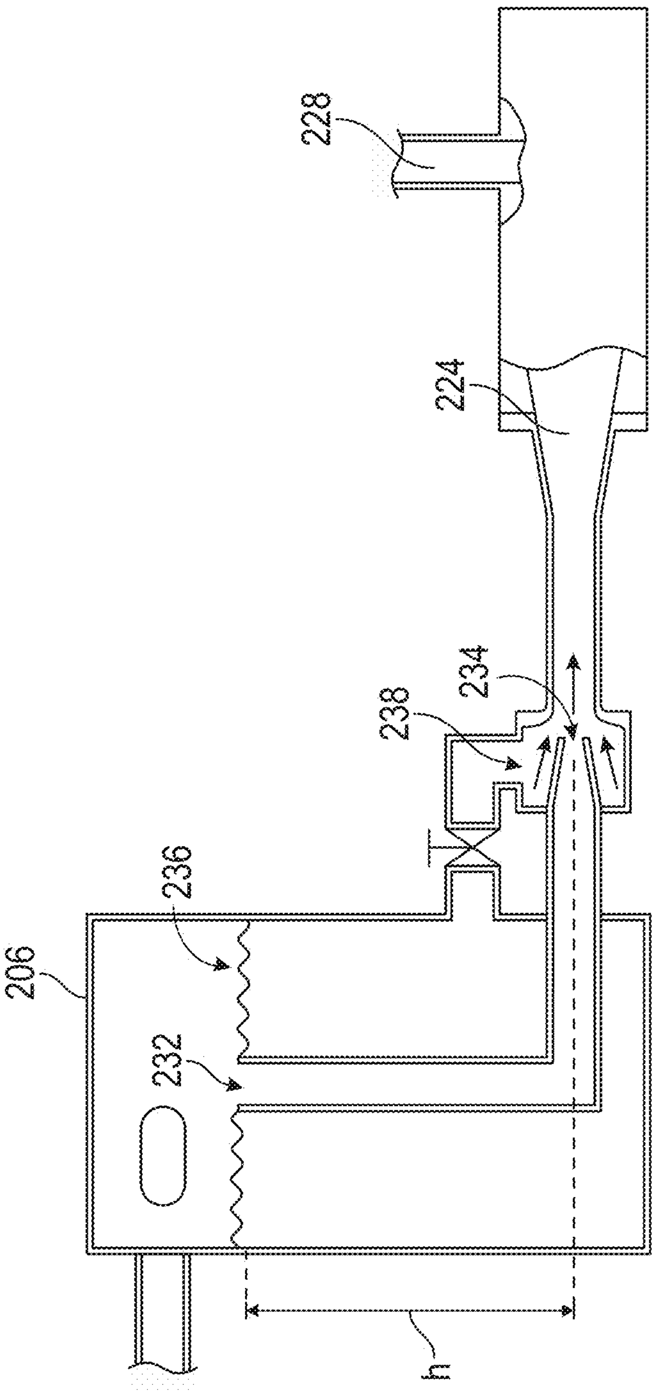
FIG. 2C is a schematic layout side view of an analysis section of a multiphase pressure boosting system in accordance with one or more embodiments disclosed herein.

The gas line 212 may extend through an interior portion of the separation tank 206. In some embodiments, the rigidity of the gas line 212 may hold the gas line 212 in position inside the separation tank 206. In some embodiments, one or more support structures (e.g., a bracket, clip, etc.) may be used to hold the gas line 212 in position inside the separation tank 206. Additionally, a portion of the gas line 212 including the gas inlet 217 may be held in a radially central position within the separation tank 206, such as shown in FIGS. 2A-C. or may be held in a different radial position within the separation tank, such as proximate to or adjacent to the inner surface of the separation tank 206.

Continuing with FIG. 2A, the mixing section 240 may be adjacent to the separation section 230 and include components fluidly connected to components in the separation section 230. For example, the mixing section 240 includes a fluid suction chamber 220. The fluid suction chamber 220 is in fluid communication with and surrounds the gas outlet 218. A liquid line 216 may fluidly connect the liquid outlet 215 to the fluid suction chamber 220. A flow control valve 214 may be positioned along the liquid line 216, which may be used to control the flow of liquid 210 from the separation tank 206 to the fluid suction chamber 220. The liquid 210 and the gas 208 are mixed in the fluid suction chamber 220 and produce a mixed fluid that may be pumped.

Continuing with FIG. 2A, the pumping section 250 includes a pump 226. In one or more embodiments, the pump may be a multiphase, axial pump. A diffuser 222 may fluidly connect the fluid suction chamber 220 to a pump inlet 224. The mixed fluid may be pumped out of the pump 226 via a pump outlet 228 as a high-pressure fluid mixture.

In some embodiments, the feed mixture may be a three-phase mixture, comprising a gas, a liquid, and a solid. To reduce the amount of solids into the separation tank 206, a solids strainer (not shown) may be installed on line 202, upstream of the tank. For conditions where some solids enter the tank, the solids may be centrifuged away to the inner wall of the tank due to the tangential entry of the mixture through entry 204. Subsequently, since the solids are relatively heavier than gas or liquid, gravity effect may cause the solids to settle at the bottom of separation tank 206. The solids may be occasionally purged via an outlet at the bottom (not shown) of separation tank 206 as part of routine maintenance.

In some embodiments, the liquid outlet 215 and liquid line 216 may be situated at the bottom of separation tank 206, where the separation tank 206 may be raised relative to the liquid outlet and liquid line. In such embodiments, as solids settle to the bottom of the separation tank, the solids may be continuously flowed through the liquid outlet and line along with the exiting liquid, thereby preventing or significantly reducing the frequency of solids cleanout maintenance from the separation tank. In this case, the solids and liquid may flow by gravity towards the suction chamber, through diffuser 222 to the pumping section, where they are pumped to a processing facility. In some embodiments, the bottom of the separation tank may include a sloped or funneled surface which may aid in directing solids to the liquid outlet.

In one or more embodiments, the separation tank 206 may be a regulating tank and may first act as a buffer chamber for the varying magnitudes of mixture gas volume fraction at the intake. Separation tanks according to embodiments of the present disclosure may act as a buffer chamber to accommodate feed mixture with a varying gas volume fraction by having a configuration that allows for gravity separation of the liquid and gas phases. For example, as a feed mixture is pumped from a well, the feed mixture may have a varying gas volume fraction (varying relative amounts of fluid and gas) depending on the type of fluids being produced from the well, the well operation being performed, and/or other factors. However, by using separation tanks with a gravity separation configuration according to embodiments of the present disclosure, regardless of the gas volume fraction in the feed mixture, the liquid phase may collect in a lower portion of the separation tank and the gas phase may collect in an upper portion, where the collected liquid and/or the collected gas may be directed out of the separation tank at controlled rates to provide a selected ratio of gas and fluid to be mixed.

In some embodiments, the inlet line 202 fluidly connecting a wellhead to the feed mixture entrance 204 may be configured to tangentially introduce the feed mixture into the separation tank 206 (e.g., aiming the feed mixture along an inner side surface of the separation tank) in order to create a centrifugal effect on the feed mixture, which may separate the liquid and gas phases in a radial direction (e.g., the liquid phase preferentially moves along the side(s) of the separation tank and the gas phase preferentially moves toward the inner radius near the center of tank) due to centrifugal forces. In one or more embodiments, the separation tank 206 may be configured to have a cylindrical shape. In other embodiments, the separation tank 206 may be configured to have a conical shape with decreasing diameter from the top of the tank to the bottom. This shape may further increase the magnitude of swirl of the fluid streams, resulting in a higher degree of separation between the gas and liquid.

In one or more embodiments, the liquid flow rate may be regulated both systematically and manually by the flow control valve 214 while the gas flow may be unrestricted for its full range of flow rate. In one or more embodiments, the exemplary pressure boosting system 200 may have a much higher quantity of gas flowing through it compared to the liquid quantity. Therefore, the volume fraction of gas in the feed mixture may be high. When the liquid inflow into the separation tank 206 is greater than the gas quantity flowing through the gas line 212, the liquid level in the separation tank 206 may start increasing and may reach a level that the liquid flows into the gas inlet 217. Therefore, liquid flow rate and level may be controlled by appropriately adjusting the flow control valve 214. In one or more embodiment, a potential feature to mitigate against liquid entry into gas inlet 217 may be to raise the height of gas entry into gas feed pipe above the feed mixture entrance 204 (e.g., where the feed mixture entrance 204 may be at an axial position between the gas inlet 217 and the liquid outlet 215).

In one or more embodiments, the feed mixture entrance 204 may be positioned above the liquid outlet 215, the gas inlet 217, and the gas outlet 218 in terms of the direction of gravity. As shown in FIG. 2A, the gas inlet 217 is shown as having a height close to the liquid level in the separation tank 206. The system may also be configured such that the gas inlet 217 is raised higher than the level of the inlet line 202. This configuration may prevent or significantly reduce the likelihood of liquid carry-over into the gas inlet 217.

In one or more embodiments, a nozzle may be positioned at the gas outlet 218. When there is a nozzle positioned at the gas outlet 218, liquid may enter the fluid suction chamber 220 within the vicinity of the discharge end of the nozzle. As the gas flows through the nozzle, it may be discharged with a very high velocity, which may create a low-pressure zone just after (downstream of) the nozzle exit. Since the region just after the nozzle exit is surrounded by the fluid suction chamber 220, the liquid in the liquid line 216 may experience suction and may be pulled into and mixed with the gas in the fluid suction chamber 220 and produce a two-phase fluid mixture. As the fluid mixture flows to the diffuser 222, the two-phase mixture may be more homogeneously distributed in the fluid path. The homogenized two-phase mixture may enter pump inlet 224 without any directional change, thus preventing any separation of the two-phase fluid mixture. For example, as shown in FIG. 2A, the outlet of the fluid suction chamber 220, the diffuser 222, and the pump inlet 224 may be axially aligned to provide a single-direction flow path for the homogenized two-phase mixture to flow from the suction chamber 220 to the pump 226.

In one or more embodiments, the gas outlet 218 may extend axially into the fluid suction chamber 220 and the liquid line 216 may extend to a radial position around the fluid suction chamber 220.

Figure 3:
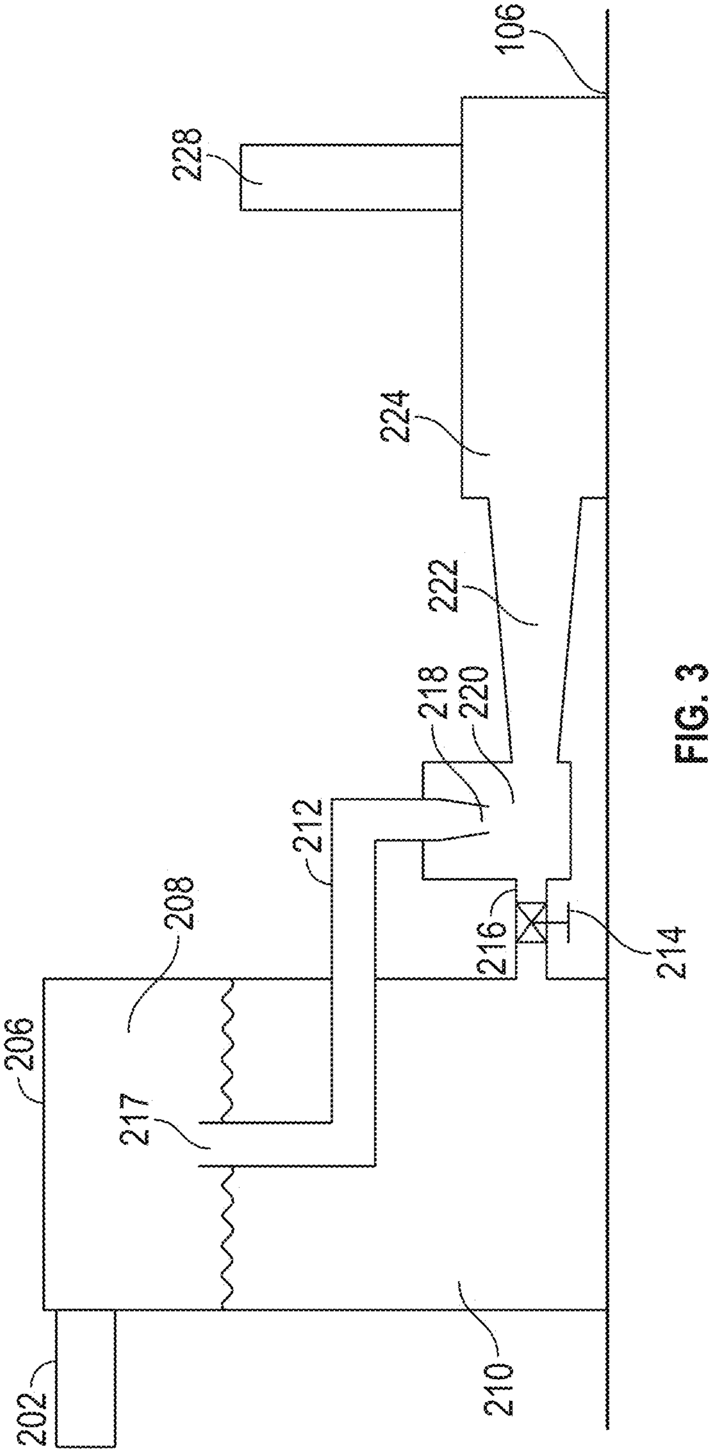
FIG. 3 is a schematic layout side view of a multiphase pressure boosting pumping system in accordance with one or more embodiments disclosed herein.

In an alternative design, as shown in FIG. 3, a pressure-boosting pumping system may have a liquid line 216 extending axially into the fluid suction chamber 220 and the gas outlet 218 may extend radially into the fluid suction chamber 220, where the axial direction of the fluid suction chamber 220 may be labeled to correspond with the direction of fluid flow exiting the fluid suction chamber 220 into the diffuser 222. In the embodiment shown in FIG. 3, the pressure-boosting pumping system may include the flow control valve 214 along with the liquid line 216 positioned below the gas outlet 218 in the fluid suction chamber 220 in terms of the direction of gravity. This alternative design may allow homogenous mixing of the liquid 210 and the gas 208 to produce a two-phase fluid mixture in the fluid suction chamber 220.

In another alternative design (not shown), the entry of the gas line (212) and liquid line (216) into the fluid suction chamber 220 may be inclined at an angle between 0 and 90 degrees. The gas-liquid mixture may then flow axially through diffuser 222 into pumping section 250. In yet another alternative design (not shown), the diffuser 222 may be located orthogonal to the suction chamber (instead of the current axial location of the diffuser). The advantage of such a configuration may be that it may make the overall system more compact which may be beneficial in offshore operations, or any operation, where space is limited.

In one or more embodiments, an alteration of design may impact the functionality of the system. For a non-limiting example, in case of high gas volume flows, the different alterations in design may functionally produce two-phase mixtures with the liquid phase being carried by the gas phase. The degree of homogeneity (or capability of having an evenly distributed liquid phase within the gas phase) may vary due to the different inclination angles (as well as the orthogonal orientation of the diffuser to the suction chamber) at which the gas and liquid phases are mixed.

In one or more embodiments, the feed mixture may comprise hydrocarbons from a well. In one or more embodiments, the feed mixture may be a crude oil mixture that includes oil, water, and gas. In one or more embodiment, the disclosed system may be utilized for transporting oil and gas mixtures from a hydrocarbon formation to a production facility.

In one or more embodiments, the feed mixture may have a gas-volume fraction in a range from about 0 to 100 vol. %. For example, the feed mixture may have a gas-volume fraction in an amount ranging from a lower limit of any of 0.01, 1.0, 5.0, 10, 20, 50, 70, 90, and 99 vol. % to an upper limit of any of 5.0, 10, 20, 50, 70, 90, 99, and 100 vol. % where any lower limit can be used in combination with any mathematically-compatible upper limit.

In one or more embodiments, the feed mixture may have a high gas-volume fraction in a range from about 70 to 100 vol. %. For example, the feed mixture may have a high gas-volume fraction in an amount ranging from a lower limit of any of 70, 75, 80, 85, 90, 95 and 99 vol. % to an upper limit of any of 75, 80, 85, 90, 95, 99, and 100 vol. % where any lower limit can be used in combination with any mathematically-compatible upper limit.

In one or more embodiments, the feed mixture may be introduced to the separation tank 206 through the feed mixture entrance 204 which is positioned at a circumferential edge of the separation tank 206. The circumferential position of the feed mixture entrance 204 may create a rotating movement or swirl or centrifugal effect on the mixture such that the gas stream stays preferentially at the inner radius near the center of the separation tank 206. Due to gas having a lower density compared to liquid, gas may rise to the upper section of the separation tank 206 resulting in a region that is rich with gas 208 as shown in FIG. 2A. In contrast, as the feed mixture swirls from the feed mixture entrance 204, the liquid stream may stay preferably at a radially outer location close to the inner wall of the separation tank 206 and may drain down by gravity to the lower section of the separation tank 206 and therefore may occupy a region that is rich with liquid 210 as shown in FIG. 2A. As shown in FIG. 2A, the disclosed pressure-boosting system may have the gas stream entering the mixing region axially (e.g., along the axial direction in line with the suction chamber 220, diffuser 222, and pump inlet 224), whereas the liquid stream enters the mixing region radially. In one or more embodiments, the pressure-boosting system may be configured such that the gas and liquid streams enter the mixing region radially and axially, respectively.

Referring to FIG. 2B, a schematic layout top view of the separation tank 206 in the pressure-boosting pumping system of FIG. 2A is shown. The arrow shows the swirling motion of the feed mixture in the separation tank 206 that allows the liquid 210 and gas 208 to separate from each other via centrifugal forces.

Separated gas from the upper, gas-rich region in the separation tank 206 may flow through an open gas inlet 217 to enter the gas line 212 extending through the separation tank 206. For example, pressure from the incoming feed mixture flow from the inlet line 202 may direct gas 208 through the gas inlet 217 and gas line 212, and out of the gas outlet 218 to the suction chamber 220. Similarly, separated liquid 210 collected in the lower, liquid-rich region in the separation tank 206 may be directed through the liquid line 216 using pressure from the incoming feed mixture flow and into the suction chamber 220. The flow control valve 214 along the liquid line 216 may be used to allow unrestricted liquid flow through the liquid line 216 or to fully or partially restrict flow through the liquid line 216 to the suction chamber 220.

As the gas flows through the gas outlet 218 nozzle into the suction chamber 220, the gas may be discharged with a very high velocity, which may create a low-pressure zone just after the nozzle exit in accordance with Bernoulli's principle. A schematic layout side view of a pressure-boosting system showing dynamic analysis relationships, including pressure changes, is shown in FIG. 2C.

Referring to FIG. 2C, the influence of a liquid level height, h, on the pumping system operation is discussed below. Considering the flow in the gas line, assuming insignificant temperature change, negligible compressibility effects and ignoring frictional losses, from the Bernoulli principle, an approximate pressure difference in the gas flow between Sections 232 and Section 234 (in the separation tank and in the suction chamber, respectively) may be obtained as presented in Equation (1). A similar analysis can also be performed for the liquid stream between Sections 236 and Section 238 (in the separation tank and in the suction chamber, respectively). Given the relatively low liquid volume flow rates (or liquid velocities) along the liquid line, as a first approximation, the pressure loss through the flow control valve may be assumed negligible. This results in the expression shown in Equation (2).

$$p_1 - p_2 \approx \frac{\rho_G}{2}\left(v_{2G}^2 - v_{1G}^2\right) - \rho_G g h; \tag{1}$$

$$p_1 - p_c \approx \frac{\rho_L}{2}\left(v_{CL}^2 - v_{1L}^2\right) - \rho_L g h; \tag{2}$$

where $P_1$=Static pressure at gas feed pipe inlet $p_2$=Static pressure just after gas nozzle exit $p_c$=Static pressure in the suction chamber $v_{1G}$=Gas velocity at gas feed pipe inlet $v_{2G}$=Gas velocity just after gas nozzle exit $v_{1L}$=Liquid velocity at top of liquid level in the tank $v_{CL}$=Liquid velocity in the suction chamber $\rho_G$=Average gas density between Section 232 and Section 234

$\rho_L$=Average liquid density between Section 236 and suction chamber, Section 238 g=Acceleration due to gravity (9.81 m/s$^2$ or 32.2 ft/s$^2$)

h=Liquid height above nozzle centerline

Equations (1) and (2) can be combined to produce Equation (3):

$$\frac{p_C - p_2}{\rho_L g h} \approx \frac{(\rho_L - \rho_G)}{\rho_L} + \frac{\rho_G}{2\rho_L g h}\left(v_{2G}^2 - v_{1G}^2\right) - \frac{1}{2gh}\left(v_{CL}^2 - v_{1L}^2\right) \tag{3}$$

Some approximations may be made to further reduce Equation (3) to parameters that impact the pressure difference between the suction chamber and nozzle exit. For the liquid stream, $V_{1L} << V_{CL}$, since the flow area of the liquid at Section 236 is much greater than the flow area at the suction chamber (Section 238). Similarly, for the gas stream $V_{1G} << V_{2G}$, since the nozzle exit area is much smaller than the area at Section 236. Therefore, the difference in velocity head for each respective fluid is mainly dominated by $V_{CL}$ and $V_{2G}$ in the liquid and gas streams, respectively. Furthermore, the gas density is very much smaller than the liquid density ($\rho_G << \rho_L$). Applying these two highlighted conditions to Equation (3), it reduces it Equation (4):

$$\frac{p_C - p_2}{\rho_L g h} \approx 1 - \frac{v_{CL}^2}{2gh} \tag{4}$$

The second term on the right-hand-side of Equation (4) is typically very much less than 1 for the volume flow rates of liquid handled by the system. Therefore Equation (4) finally reduces $p_C - p_2 \approx \rho_L gh$. This implies for a given liquid density, the static pressure difference between the suction chamber and the nozzle exit is approximately a linear function of the liquid level, h. If the liquid flow rate into separation tank 206 is high, the liquid level in the tank will rise, thereby increasing the pressure difference between nozzle and its surroundings. The higher this pressure difference, the more the liquid is pulled into the flow exiting the nozzle, which can also contribute to systematically adjusting the amount of liquid flow.

EXAMPLE

An exemplary test run data generated using an exemplary pressure boosting system as disclosed is discussed below. The gas volume fraction in a multiphase oil and gas mixture may not be constant with time, and therefore, the gas volume fraction at an inlet of a pump can vary in a range from about 0 to 100 vol. %. The exemplary pressure boosting system was tested with an oil and gas feed mixture that has a high gas volume fraction of about 90 vol. %. The test results are shown in Table 1 below.

TABLE 1

Pump Test Data from the Multiphase Pressure Boosting System

| Rotational Speed (RPM) | Air Volume Flow Rate (BPD) | Water Volume Flow Rate (BPD) | Total Volume Flow Rate (BPD) | Pump Intake Pressure (psig) | Pump Discharge Pressure (psig) | Pump Pressure Boost (psi) | Gas Volume Fraction, GVF (%) |
|---|---|---|---|---|---|---|---|
| 5921 | 3818 | 394 | 4212 | 47.2 | 136.5 | 89.3 | 90.7 |
| 5949 | 4479 | 405 | 4884 | 46.6 | 112.9 | 66.3 | 91.7 |
| 5953 | 5524 | 503 | 6027 | 45.1 | 99.6 | 54.6 | 91.7 |
| 5966 | 6812 | 597 | 7410 | 42.1 | 69.8 | 27.7 | 91.9 |

Figure 4:
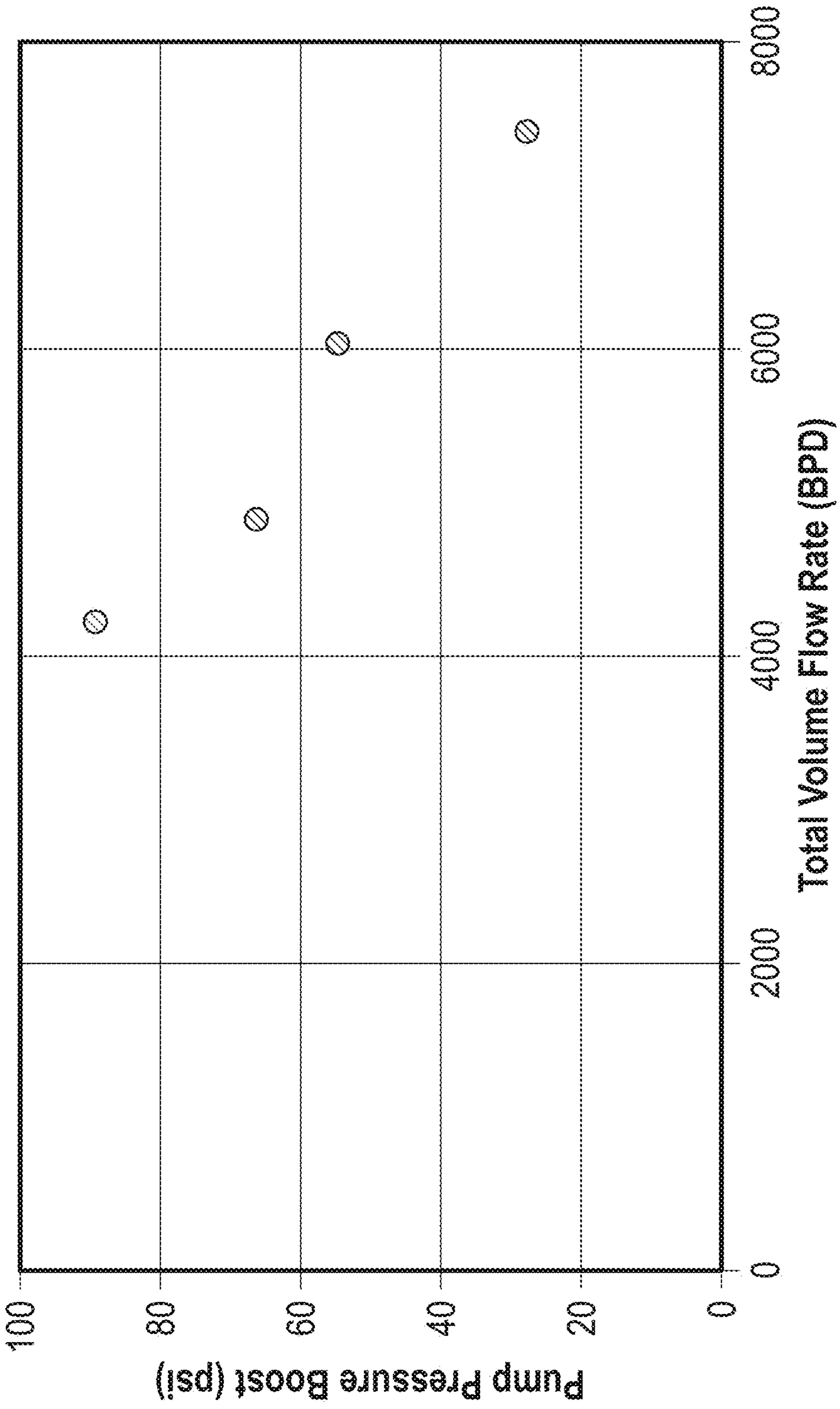
FIG. 4 is a graphical representation of the pump pressure as a function of the total volume flow rate of a two-phase mixture flowing through a pump in accordance with one or more embodiments disclosed herein.

As shown in the Table 1, the exemplary pressure-boosting system consistently performed (based on the rotational speed data translating into stable power consumption) when operated with a feed mixture that comprised a high gas volume fraction in a range from 90.7 to 91.9 vol. %. As shown in FIG. 4, the pump pressure varies with the total volumetric flow rate of the tested mixture through the pump. At a higher flow rate, the pump pressure drops.

Figure 5:
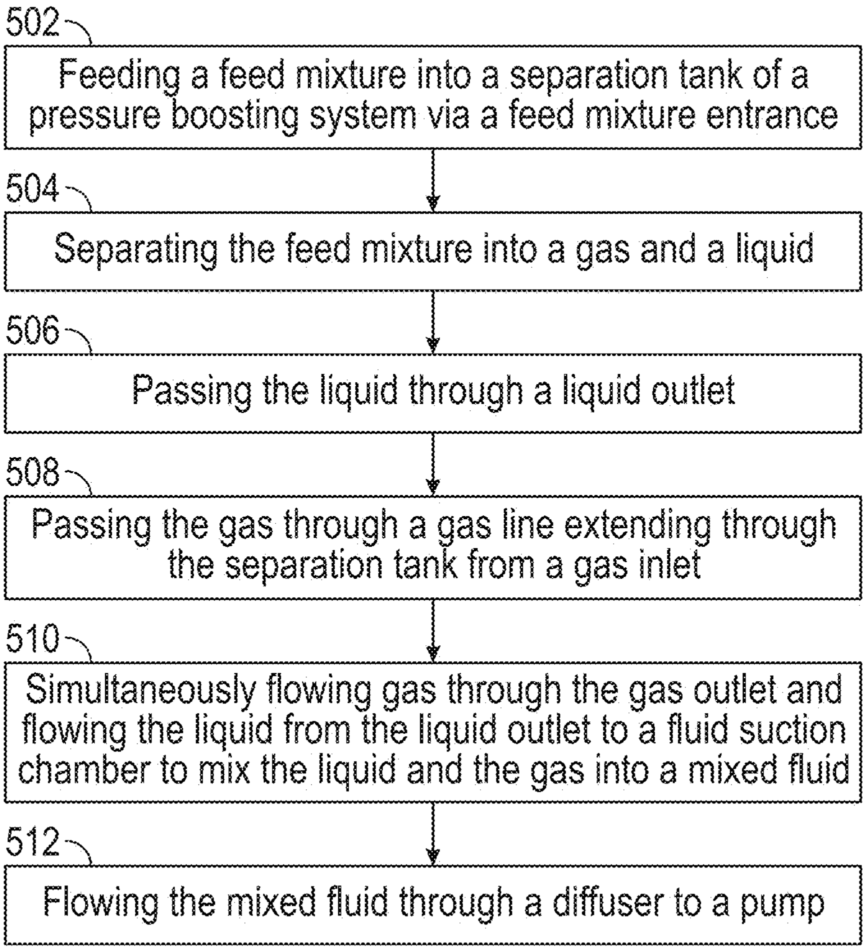
FIG. 5 is a flowchart showing a series of exemplary method steps for a multiphase pressure boosting pumping system in accordance with one or more embodiments disclosed herein.

Referring to FIG. 5, a flowchart is shown with a series of exemplary method steps for a multiphase pressure-boosting pumping system as disclosed herein. The method for pumping a feed mixture includes first feeding the feed mixture into a separation tank of a pressure-boosting system via a feed mixture entrance in step 502. The feed mixture may be separated and contained in the separation tank. The method includes separating the feed mixture into a gas and a liquid in step 504. A gas phase in the feed mixture may be separated from the liquid phase in the feed mixture using gravity and/or centrifugal forces, such as described above, and collected into different regions of the separation tank. The method further includes passing the liquid from the separation tank through a liquid outlet located at a lower position from the feed mixture entrance along a wall of the separation tank in step 506. The method also includes passing the gas through a gas line extending through the separation tank from a gas inlet located in an interior of the separation tank to a gas outlet located outside of the separation tank in step 508. In step 510, the method includes simultaneously flowing gas through the gas outlet and flowing the liquid from the liquid outlet through a liquid line to a fluid suction chamber surrounding the gas outlet to mix the liquid and the gas into a mixed fluid. Finally, the method includes flowing the mixed fluid through a diffuser to a pump in step 512.

In one or more embodiments, the method may further include controlling the flow of the liquid through the liquid line using a flow control valve positioned along the liquid line. A wide variety of flow control valves known to a person ordinary in the skill may be used to increase or decrease the flow rate of the liquid through the liquid line.

In one or more embodiments, the method may further include controlling the flow of the liquid to provide the mixed fluid with a gas-volume fraction ranging from 0 to 98%.

In one or more embodiments, the method may further include fluidly connecting a wellhead to the feed mixture entrance via an inlet line.

In one or more embodiments, the feed mixture as disclosed in the methods may be a two-phase mixture comprising well liquids (e.g., oil) and gas.

Figure 6A:
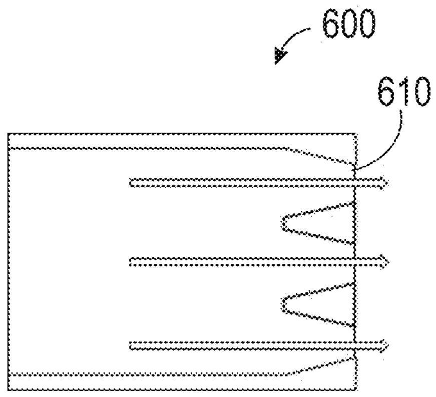
FIG. 6A shows a cross-sectional side view of a gas outlet and FIG. 6B shows a front view of the gas outlet in FIG. 6A.
Figure 6B:
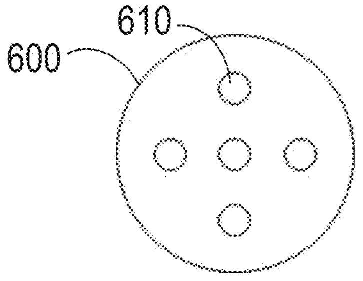

In one or more embodiments, the method may further include positioning a nozzle at the gas outlet. In some embodiments, one, two, three or more additional nozzles may be positioned at the gas outlet. Incorporating more than one nozzle may help to increase the contact area between the gas and liquid streams, and therefore, increase component redundancy, to enhance overall system reliability during operation. In a non-limiting example, shown in FIGS. 6A-B, a gas outlet 600 may include a nozzle head having five nozzles 610. However, the number and orientation of the nozzles may be varied independently.

In one or more embodiments, the method may include configuring the gas line to maintain a gas pressure ranging from, for example 30 to 80 psig (pounds per square inches).

In one or more embodiments, the method may include passing the gas through the gas line at a velocity ranging from, for example, 30 to 80 m/s (meters per second).

In one or more embodiments, the method may include flowing the liquid through the liquid line at a flow rate in a range from 50 to 120 BPD (barrel per day). The flow rate may be dependent upon a given operating field condition.

In one or more embodiments, the method may further include cleaning out accumulated solids from the bottom of the separation tank. For example, a separation tank may include a lid that when opened allows access inside of the separation tank to remove accumulated solids from the bottom of the tank. When the accumulated solids from the separation tank are removed, the lid may then be closed again to retain the operational configuration. The top of the tank may include gaskets for pressure sealing. The tank lid may be removed, and the inside of the tank may be accessed, depending on tank size. In some embodiments, the method of cleaning the tank may be part of total shut-down maintenance. In other embodiments, the accumulated solids may be purged from the tank (with or without a lid) through the bottom of the tank as described in an alternative configuration above. A control system may be used for purging the solids from the tank. Furthermore, a control system may also be used to adjust the flow control valve in the liquid line to regulate the liquid level in the tank.

Embodiments of the present disclosure may provide at least one of the following advantages. The disclosed pressure-boosting system may enhance the mixing of the gas and liquid streams to attain a homogenously conditioned flow of the mixture entering the pumping section of the pressure-boosting system. The conditioned flow may enable the pumping section to operate in a stable manner without pulsating motions. The benefits of the system may include preventing slugging operation of the pumping system, increasing pressure boosting of the gas-liquid mixture, and enhancing the ability of the pump to handle a higher gas-volume fraction mixture at the inlet of the pumping section. These attributes of the system may increase the overall operational efficiency and economic bottom line from a well.

When the word "approximately" or "about" is used, this term may mean that there can be a variance in the value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it should be understood that another one or more embodiments are from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A system for pumping a feed mixture, comprising:
a separation section, comprising:
a separation tank comprising a feed mixture entrance and a liquid outlet located at different axial positions along a wall of the separation tank;
a gas line extending through the separation tank from a gas inlet located in an interior of the separation tank to a gas outlet located outside of the separation tank;
a mixing section comprising a fluid suction chamber surrounding the gas outlet;
wherein a liquid line fluidly connects the liquid outlet to the fluid suction chamber;
wherein a flow control valve is positioned along the liquid line; and
a pumping section comprising a pump;
wherein a diffuser fluidly connects the fluid suction chamber to a pump inlet.

2. The system of claim 1, wherein the gas outlet extends axially into the fluid suction chamber and the liquid line extends to a radial position around the fluid suction chamber.

3. The system of claim 1, further comprising an inlet line fluidly connecting a wellhead to the feed mixture entrance.

4. The system of claim 1, further comprising a plurality of nozzles provided at the gas outlet.

5. The system of claim 1, wherein the separation tank is cylindrical or conical in shape.

6. The system of claim 1, wherein the feed mixture entrance is positioned above the liquid outlet, the gas inlet, and the gas outlet in terms of gravimetrical direction.

7. The system of claim 1, wherein the feed mixture is a two-phase mixture.

8. The system of claim 1, wherein the feed mixture is a three-phase mixture.

9. The system of claim 1, wherein the pump is a multiphase, axial pump.

10. The system of claim 1, wherein the feed mixture comprises hydrocarbons from a well.

11. A method for pumping a feed mixture, comprising:
feeding the feed mixture into a separation tank of a pressure boosting system via a feed mixture entrance;
separating the feed mixture into a gas and a liquid in the separation tank;
passing the liquid through a liquid outlet, wherein the liquid outlet is located at lower position from the feed mixture entrance along a wall of the separation tank;
controlling flow of the liquid through the liquid line using a flow control valve positioned along the liquid line;
passing the gas through a gas line extending through the separation tank from a gas inlet located in an interior of the separation tank to a gas outlet located outside of the separation tank;
simultaneously flowing gas through the gas outlet and flowing the liquid from the liquid outlet through a liquid line to a fluid suction chamber surrounding the gas outlet to mix the liquid and the gas into a mixed fluid; and
flowing the mixed fluid through a diffuser to a pump.

12. The method of claim 11, wherein flow of the liquid is controlled to provide the mixed fluid with a gas-volume fraction ranging from 0 to 98%.

13. The method of claim 11, further comprising fluidly connecting a wellhead to the feed mixture entrance via an inlet line.

14. The method of claim 11, further comprising a nozzle provided at the gas outlet.

15. The method of claim 14, further comprising one or more additional nozzles positioned at the gas outlet.

16. The method of claim 11, wherein the gas line is configured to maintain a gas pressure ranging from 30 to 80 psig.

17. The method of claim 11, wherein the gas is passed through the gas line at a velocity ranging from 30 to 80 m/s.

18. The method of claim 11, wherein the liquid is flowed through the liquid line at a flow rate in a range from 50 to 120 BPD.

19. The method of claim 11, further comprising cleaning out accumulated solids from bottom of the separation tank.

* * * * *